United States Patent
Lee et al.

(10) Patent No.: US 9,947,289 B2
(45) Date of Patent: Apr. 17, 2018

(54) USER INTERFACE APPARATUS AND USER INTERFACE METHOD

(71) Applicant: SAMSUNG ELECTRONICS CO., LTD., Suwon-si (KR)

(72) Inventors: Jun Haeng Lee, Hwaseong-si (KR); Eric Hyunsurk Ryu, Hwaseong-si (KR); Chang Woo Shin, Hwaseong-si (KR); Joo Yeon Woo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/687,574

(22) Filed: Apr. 15, 2015

(65) Prior Publication Data
US 2016/0035315 A1    Feb. 4, 2016

(30) Foreign Application Priority Data
Jul. 29, 2014 (KR) ........................ 10-2014-0096631

(51) Int. Cl.
G09G 5/14 (2006.01)
G09G 5/00 (2006.01)
G09G 5/02 (2006.01)
G06F 3/14 (2006.01)
G06F 3/01 (2006.01)

(52) U.S. Cl.
CPC ............ G09G 5/006 (2013.01); G06F 3/011 (2013.01); G06F 3/14 (2013.01); G09G 5/026 (2013.01); G09G 2340/12 (2013.01); G09G 2340/125 (2013.01); G09G 2354/00 (2013.01); G09G 2360/144 (2013.01); G09G 2380/02 (2013.01)

(58) Field of Classification Search
CPC ...................................................... G09G 5/377
USPC .......................................................... 345/629
See application file for complete search history.

(56) References Cited

U.S. PATENT DOCUMENTS 5,617,181 A * 4/1997 Yanagihara ......... G03F 7/70275
355/46
5,790,184 A * 8/1998 Sato ................... H04N 13/0048
348/42
6,253,161 B1 * 6/2001 Arias-Estrada ......... G01S 11/12
348/E3.018

(Continued)

FOREIGN PATENT DOCUMENTS

JP    5-304646 A    11/1993
JP    3492942 B2    2/2004

(Continued)

OTHER PUBLICATIONS

Elizabeth N. Mazzae et al. "On-Road Study of Drivers' Use Rearview Video Systems (ORSDURVS)" Sep. 2008.*

*Primary Examiner* — Javid A Amini
(74) *Attorney, Agent, or Firm* — Sughrue Mion, PLLC

(57) ABSTRACT

A user interface apparatus and a method of improving user interface are provided. The user interface apparatus may detect a change in an incident light and may control a display to represent the detected change in the light to be overlaid on image content. Provided is a user interface apparatus including: a display configured to display image content; a detector configured to detect a change in an incident light; and a controller configured to control the display to overlay the detected change in the light on the image content.

16 Claims, 15 Drawing Sheets

(56) References Cited

U.S. PATENT DOCUMENTS

| | | |
|---|---|---|
| 7,728,269 B2 | 6/2010 | Lichtsteiner et al. |
| 8,400,371 B2 | 3/2013 | Kato et al. |
| 2006/0079324 A1* | 4/2006 | Watanabe ............... A63F 13/10 463/30 |
| 2006/0108611 A1* | 5/2006 | Seitz ........................ G01J 9/00 257/222 |
| 2007/0030343 A1* | 2/2007 | Rohde ..................... H04N 7/18 348/47 |
| 2007/0279521 A1* | 12/2007 | Cohen ................ G06K 9/00664 348/376 |
| 2007/0293188 A1* | 12/2007 | Houghton ............... H04L 12/66 455/404.2 |
| 2008/0135731 A1* | 6/2008 | Lichtsteiner ........... H04N 3/155 250/208.1 |
| 2008/0298640 A1* | 12/2008 | Reinpoldt, III .... G06K 9/00771 382/107 |
| 2009/0072170 A1* | 3/2009 | Kurihara ................. G01S 17/87 250/559.29 |
| 2009/0077214 A1* | 3/2009 | Buster .................... G06Q 10/10 709/223 |
| 2009/0079830 A1* | 3/2009 | Ekpar .............. H04N 21/21805 348/148 |
| 2009/0087032 A1* | 4/2009 | Boyd ..................... H04N 5/144 382/107 |
| 2009/0245571 A1* | 10/2009 | Chien ....................... G06K 9/38 382/103 |
| 2009/0322489 A1* | 12/2009 | Jones ................. G06K 9/00771 340/10.3 |
| 2010/0002071 A1* | 1/2010 | Ahiska ................... H04N 5/217 348/36 |
| 2010/0066828 A1* | 3/2010 | Disaro ................... H04N 17/002 348/143 |
| 2010/0103241 A1* | 4/2010 | Linaker ................... G06Q 30/06 348/14.02 |
| 2010/0201896 A1* | 8/2010 | Ostreko ..................... B60R 1/12 349/1 |
| 2011/0013087 A1* | 1/2011 | House ................ A63B 24/0021 348/564 |
| 2011/0090344 A1* | 4/2011 | Gefen ...................... G06T 7/204 348/169 |
| 2011/0153310 A1* | 6/2011 | Ehlen ...................... G06T 11/00 704/9 |
| 2011/0183732 A1* | 7/2011 | Block ..................... G06Q 30/02 463/1 |
| 2011/0202277 A1* | 8/2011 | Haddad ................ G01S 13/885 702/7 |
| 2011/0228987 A1* | 9/2011 | Iwasaki ................... G06T 7/215 382/107 |
| 2011/0234619 A1* | 9/2011 | Tokunaga ............. G02B 26/101 345/589 |
| 2011/0276922 A1* | 11/2011 | Boyd ....................... G06F 3/011 715/833 |
| 2011/0285910 A1* | 11/2011 | Bamji ..................... G01S 17/89 348/631 |
| 2012/0011454 A1* | 1/2012 | Droz ................... H04L 12/1827 715/758 |
| 2012/0062732 A1* | 3/2012 | Marman ................. H04N 7/18 348/142 |
| 2012/0062743 A1* | 3/2012 | Lynam .................... B60Q 9/005 348/148 |
| 2012/0218412 A1* | 8/2012 | Dellantoni .......... G01C 21/3602 348/148 |
| 2013/0083198 A1* | 4/2013 | Maslan ................... H04N 7/188 348/155 |
| 2013/0174205 A1* | 7/2013 | Jacobsen ........... H04N 21/43637 725/81 |
| 2014/0132758 A1* | 5/2014 | Saptharishi ............... H04N 7/18 348/135 |
| 2014/0139609 A1* | 5/2014 | Lu ........................... H04N 7/15 348/14.03 |
| 2014/0152530 A1* | 6/2014 | Venkatesha ............ G01B 11/00 345/8 |
| 2014/0176350 A1* | 6/2014 | Niehsen ................ B62D 15/025 340/988 |
| 2014/0232750 A1* | 8/2014 | Price ...................... G06T 19/006 345/633 |
| 2014/0300636 A1* | 10/2014 | Miyazaya .............. H04R 5/033 345/633 |
| 2014/0326854 A1* | 11/2014 | Delbruck ................ H04N 5/378 250/204 |
| 2015/0062164 A1* | 3/2015 | Kobayashi .............. G06T 11/60 345/633 |
| 2015/0080072 A1* | 3/2015 | Kim ....................... A63F 13/213 463/7 |
| 2015/0145995 A1* | 5/2015 | Shahraray .............. H04N 7/181 348/148 |
| 2015/0153835 A1* | 6/2015 | Perez ...................... G06F 3/017 345/156 |
| 2015/0161476 A1* | 6/2015 | Kurz ..................... G06K 9/4671 382/190 |
| 2015/0187224 A1* | 7/2015 | Moncrief ................. G09B 9/24 434/30 |
| 2015/0199025 A1* | 7/2015 | Holz ................... G06K 9/00355 345/156 |
| 2015/0206337 A1* | 7/2015 | Roimela ................... G06T 7/60 345/419 |
| 2015/0262208 A1* | 9/2015 | Bjontegard ........ G06Q 30/0202 705/7.31 |
| 2015/0264255 A1* | 9/2015 | Budihal ............... H04N 5/23222 348/170 |
| 2015/0264258 A1* | 9/2015 | Bervoets ............ H04N 5/23238 348/36 |
| 2015/0290795 A1* | 10/2015 | Oleynik .................. G05B 19/42 700/257 |
| 2015/0297949 A1* | 10/2015 | Aman ..................... G06T 7/2033 348/157 |
| 2015/0329217 A1* | 11/2015 | Kirk ....................... B64D 45/00 701/301 |
| 2015/0341542 A1* | 11/2015 | Preston ................... G03B 13/20 348/346 |
| 2015/0346701 A1* | 12/2015 | Gordon ................. G05B 15/02 700/275 |
| 2016/0000515 A1* | 1/2016 | Sela ....................... G06T 7/0028 600/424 |
| 2016/0019427 A1* | 1/2016 | Martin ............... G06K 9/00771 382/103 |
| 2016/0042621 A1* | 2/2016 | Hogg ................. G08B 13/19604 348/155 |
| 2016/0261839 A1* | 9/2016 | Holub ..................... G01J 3/02 |

FOREIGN PATENT DOCUMENTS

| | | | |
|---|---|---|---|
| JP | 2004-233948 A | | 8/2004 |
| JP | 2010-145436 A | | 7/2010 |
| JP | 5171329 B2 | * | 3/2013 |
| JP | 2013-61848 A | | 4/2013 |
| JP | 2013-164737 A | | 8/2013 |
| JP | 2015228095 A | * | 12/2015 |
| WO | 2006/064655 A1 | | 6/2006 |
| WO | 2006/128315 A1 | | 12/2006 |

* cited by examiner

300

900

USER INTERFACE APPARATUS AND USER INTERFACE METHOD

CROSS-REFERENCE TO RELATED APPLICATION

This application claims priority from Korean Patent Application Nos. 10-2014-0096631, filed on Jul. 29, 2014, in the Korean Intellectual Property Office, the disclosure of which is incorporated herein by reference in its entirety.

BACKGROUND

1. Field

Methods and apparatuses consistent with exemplary embodiments relate to a user interface apparatus and a user interface method.

2. Description of the Related Art

Human-computer interaction (HCI) technology refers to technology for enhancing an interaction between a user and a computer. A user input may be transmitted to a computer using various user interfaces, for example, a mouse, a keyboard, and a touchscreen. Such a user interface may be implemented using a hardware component, a software component, or a combination of the hardware component and the software component.

Because a camera, a microphone, and other components are widely utilized in electronic devices, a user interface may further enhance an interaction between a user and a computer. Accordingly, various functions of the electronic devices may be efficiently utilized.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there may be provided a user interface apparatus including: a display configured to display image content; a detector configured to detect a change in an incident light; and a controller configured to control the display to overlay the change in the light on the image content and display the image content and the detected change.

The detector may include an event-based vision sensor configured to detect an event where the incident light varies and configured to time-asynchronously generate a signal indicating the change in the light.

The incident light may vary due to moving of an object with respect to the user interface apparatus The controller may detect pixels corresponding to the change in the light from among a plurality of pixels of the display and may be configured to control values of the detected pixels so that the overlaid change of the light is represented on the image content.

The controller may analyze the change in the light to minimize a portion in which the change in the light is represented to be overlaid on the image content.

The controller may be configured to generate information associated with an object present around a user based on the change in the light and may be configured to control the display based on the generated information.

The information associated with the object may include at least one of a type of the object, a velocity of the object, and a distance between the user and the object, and a location of the object.

The controller may determine whether the change in the light is caused by a hand of a user, and may process a user input based on the change in the light in response to the change in the light being determined to be caused by the hand of the user.

The incident light may include an incident light from a surrounding environment of the user interface apparatus.

According to an aspect of another exemplary embodiment, there may be provided a user interface apparatus including: a sound outputter configured to output sound content; a detector configured to detect a change in an input sound; and a controller configured to control the sound outputter to output the change in the input sound.

The detector may include an event-based auditory sensor configured to detect an event where the input sound varies and configured to time-asynchronously generate a signal indicating the change in the input sound.

The detector may include: a sound collector configured to collect the input sound; and a generator configured to analyze the collected sound and configured to generate a signal indicating the change in the input sound.

The input sound may vary due to moving of an object with respect to the user interface apparatus.

The controller may be configured to analyze the change in the input sound to minimize a duration of time in which the change in the input sound is output.

The controller may be configured to generate information associated with a sound source present around the user interface apparatus based on the change in the input sound and configured to control at least one of the display and the sound outputter based on the generated information.

The information associated with the sound source may include at least one of a type of the sound source and a location of the sound source.

The input sound comprises an input sound from a surrounding environment of the user interface apparatus.

According to an aspect of another exemplary embodiment, there may be provided a user interface method including: displaying image content on a display; detecting a change in an incident light; and controlling the display to represent the change in the light to be overlaid on the image content.

According to an aspect of another exemplary embodiment, there may be provided a user interface method including: outputting sound content using a sound outputter; detecting a change in an input sound; and controlling the sound outputter to output the change in the input sound.

According to an aspect of another exemplary embodiment, there may be provided user interface apparatus including: a display configured to display image content; a detector configured to detect an object surrounding the user interface apparatus; and a controller configured to control the display to overlay the detected object on the image content and display the image content and the detected object.

The detector may be configured to detect the object by detecting a change of amount of light by the detector.

According to an aspect of another exemplary embodiment, there may be provided user interface apparatus including: a user interface apparatus including: a sound outputter configured to output sound content; a detector configured to detect a change in external sound from a surrounding environment of the user interface apparatus; and a controller configured to control the sound outputter to output the change in the external sound.

BRIEF DESCRIPTION OF THE DRAWINGS

The above and/or other aspects of exemplary embodiments will become apparent and more readily appreciated from the following detailed description of exemplary embodiments, taken in conjunction with the accompanying drawings of which.

DETAILED DESCRIPTION

Figure 1:
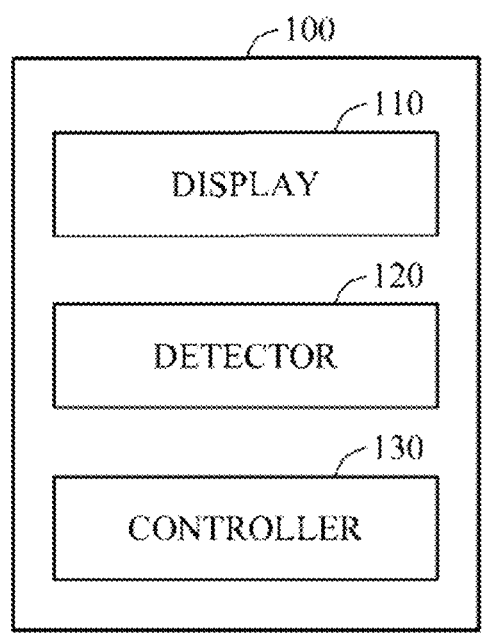
FIG. 1 illustrates a user interface apparatus according to an exemplary embodiment.

Reference will now be made in detail to exemplary embodiments, examples of which are illustrated in the accompanying drawings, wherein like reference numerals refer to like elements throughout. Exemplary embodiments are described below in order to explain the present disclosure by referring to the figures.

The following exemplary embodiments may be applicable to human-computer interaction (HCI) technology, and may be employed for a wearable device such as a head mounted device (HMD) in a shape of glasses, a hair band, or a cap, and a mobile device such as a mobile phone, a smartphone, a personal digital assistant (PDA), and a tablet computer.

FIG. 1 illustrates a user interface apparatus 100 according to an exemplary embodiment. Referring to FIG. 1, the user interface apparatus 100 includes a display 110, a detector 120, and a controller 130.

The display 110 may display image content. The image content may include at least one of a video, a still image, a graphic user interface (GUI), and a text. For example, the display 110 may display a video such as a movie, a streaming broadcasting, and a video call. Alternatively, the display 110 may display a GUI such as an icon. Alternatively, the display 110 may display a text such as an e-mail and a document.

The detector 120 may detect at least one of a change in a light, a change in a sound, and a change in a surrounding environment. The change in the light may include a change in intensity of light and a change in a color of light. The change in the sound may include a change in a magnitude of sound and a change in a frequency of sound. The change in the surrounding environment may include a change in a temperature around a user and a change in humidity around the user. Alternatively, the change in the surrounding environment may include a change in concentration of a predetermined material such as fine dust and carbon dioxide.

For example, the detector 120 may detect whether the incident light becomes brighter or becomes darker. Alternatively, the detector 120 may detect whether a wavelength of incident light increases or decreases, that is, whether the wavelength of incident light becomes longer or becomes shorter. Alternatively, the detector 120 may detect whether the input sound increases or decreases (i.e., the sound becomes louder or becomes softer), or whether a frequency of the input sound increases or decreases (i.e., the frequency becomes higher or becomes lower). A configuration of the detector 120 will be further described below.

The controller 130 may control the display 110 to represent the at least one of the change in the light, the change in the sound, and the change in the surrounding environment detected by the detector 120 to be overlaid on the image content. For example, the controller 130 may detect pixels corresponding to the change in the light from among a plurality of pixels of the display 110. The controller 130 may control values of the detected pixels so that the change in the light may be represented to be overlaid on the image content. A configuration of the controller 130 will be further described below.

Figure 2:
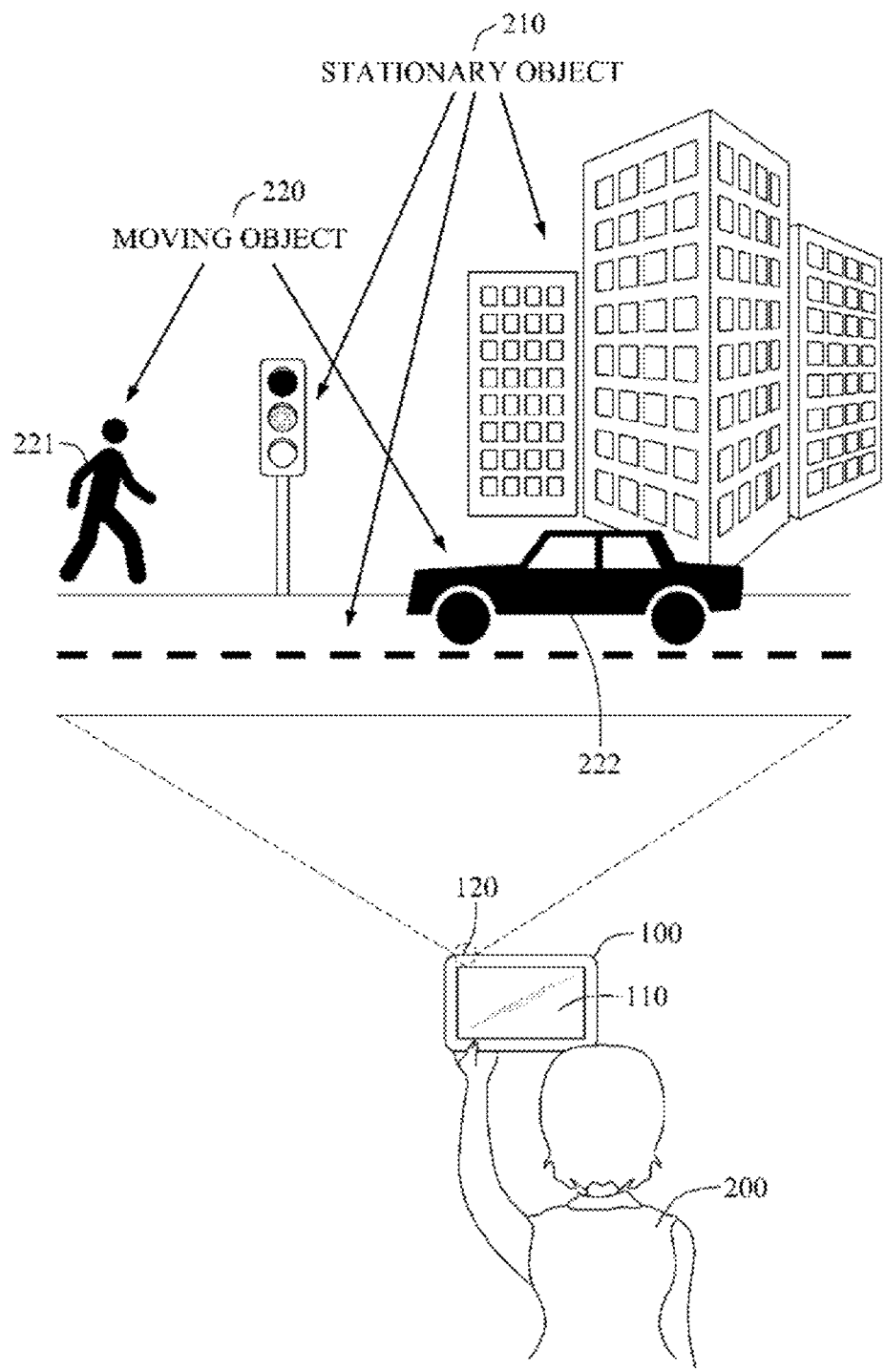
FIGS. 2 through 7 illustrate operations of a user interface apparatus according to exemplary embodiments.

FIGS. 2 through 7 illustrate operations of the user interface apparatus 100 according to exemplary embodiments. Referring to FIG. 2, the user interface apparatus 100 includes the display 110 on one side and includes the detector 120 on another side. For example, when image content is being displayed on the display 110 toward a user 200, the detector 120 may detect a change in an incident light from an opposite direction. Hereinafter, a direction at which the display 110 is facing may be referred to as a front direction and a direction at which the detector 120 is facing may be referred to as a rear direction.

A stationary object 210 and a moving object 220 may be present in the rear with respect to the user interface apparatus 100 (i.e., towards the rear direction). In the exemplary embodiment, the detector 120 may selectively detect the moving object 220 by detecting the change in the light. For example, the detector 120 may concurrently receive a light reflected from the stationary object 210 and a light reflected from the moving object 220. When it is assumed that a light source, for example, the sun substantially does not vary in a predetermined time section, for example, in one second, the light reflected from the stationary object 210 and incident to the detector 120 may not vary. On the contrary, the light reflected from the moving object 220 and incident to the detector 120 may vary. As described above, the detector 120 may selectively detect the moving object 220 by detecting the change in the incident light.

Specifically, the stationary objects 210 such as a building, a signal light, and a road, may be present in the rear direction with respect to the user interface apparatus 100. Because the light reflected from the stationary object 210 and incident to the detector 120 does not vary, the change in the light is not detected by the detector 120. The moving object 220 such as a moving person 221 and a moving vehicle 222 may be present in the rear direction. Since the light reflected from the moving object 220 and incident to the detector 120 varies, the change in the light is detected by the detector 120.

The controller 130 of the user interface apparatus 100 may control the display 110 to represent the detected change in the light to be overlaid on the image content. The user 200 may concentrate on the image content displayed on the display 110. Accordingly, the user 200 may be exposed to a danger such as being bumped against a surrounding object due to the unawareness of the surrounding object. The user interface apparatus 100 may provide change information of a surrounding environment to the user 200 by selectively displaying the moving object 220 among objects present around the user 200. Here, the user interface apparatus 100 may represent change information of the surrounding environment to be overlaid on the image content so that the user 200 may be provided with change information of the surrounding environment while continuously displaying the image content.

The controller 130 may detect pixels corresponding to the change in the light detected by the detector 120. The controller 130 may overlay the change in the light to be overlaid on the image content by controlling values of the detected pixels.

The controller 130 may control values of the detected pixels using a variety of methods. For example, the controller 130 may set values of the detected pixels as predetermined values. The controller 130 may control a predetermined color, for example, black and white, to be displayed on the detected pixels. Alternatively, the controller 130 may adjust values of the detected pixels using a predetermined method. The detected pixels have original values (hereinafter, "content values") that are to be displayed by the image content. The controller 130 may adjust content values for the detected pixels. The controller 130 may increase or decrease brightness of content values for the detected pixels.

Figure 3:

As an example, referring to FIG. 3, video content 300 may be played on the display 110. The controller 130 may control the display 110 to represent a change in a light to be overlaid on the video content 300. When the video content 300 is being played on the display 110, the detector 120 may detect the change in the light incident from a rear direction. A first object 310 overlaid on the video content 300 may correspond to the moving person 221 of FIG. 2. A second object 320 overlaid on the video content 300 may correspond to the moving vehicle 222 of FIG. 2.

Figure 4:
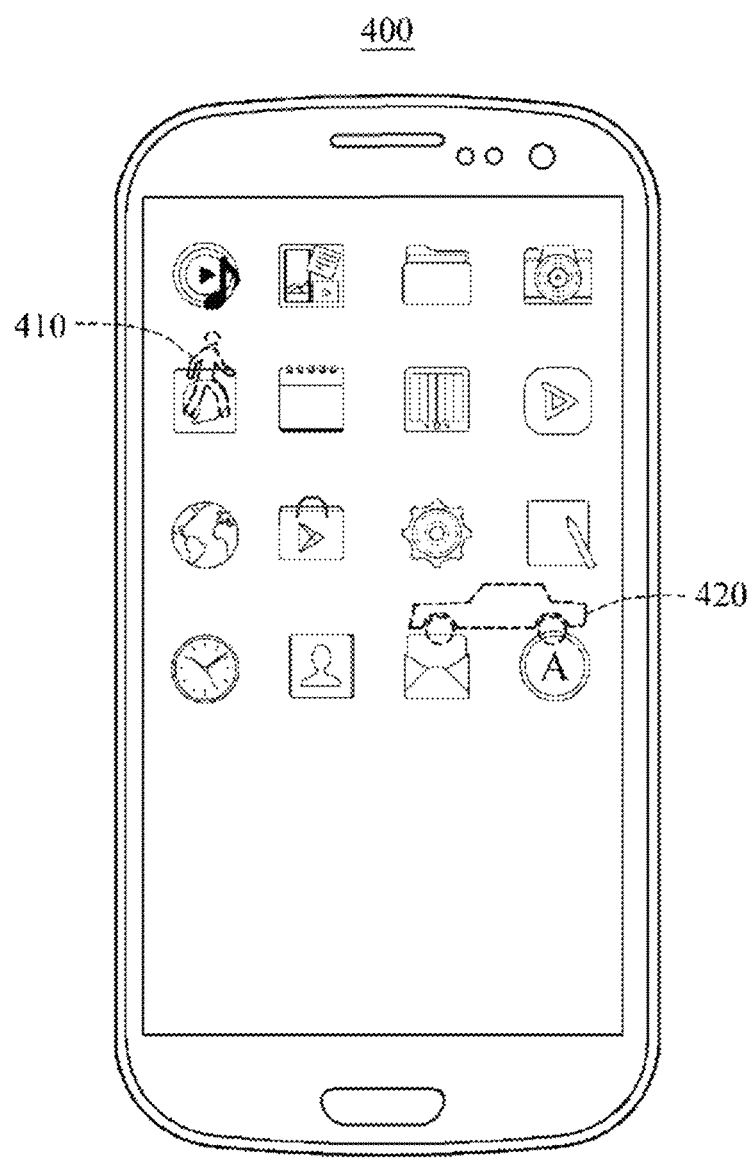

As another example, referring to FIG. 4, menu content 400 including icons may be displayed on the display 110. The controller 130 may control the display 110 to represent a change in a light to be overlaid on the menu content 400. A first object 410 overlaid on the menu content 400 may correspond to the moving person 221 of FIG. 2. A second object 420 overlaid on the menu content 400 may correspond to the moving vehicle 222 of FIG. 2.

Figure 5:
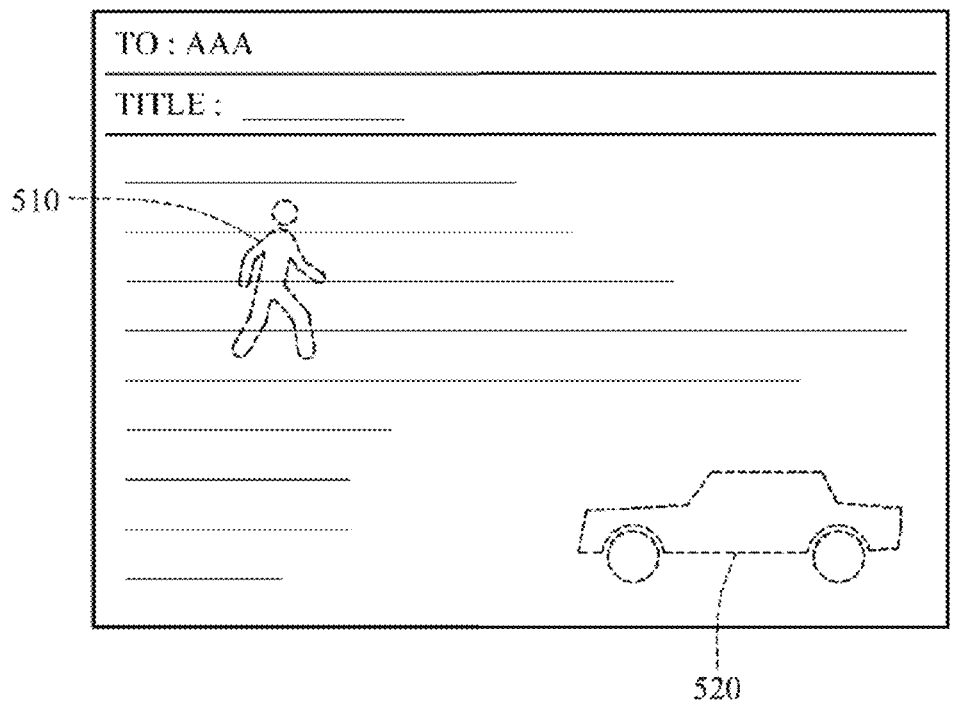

In another exemplary embodiment, referring to FIG. 5, application content 500 may be displayed on the display 110. The controller 130 may control the display 110 to represent a change in a light to be overlaid on the application content 500. A first object 510 overlaid on the application content 500 may correspond to the moving person 221 of FIG. 2. A second object 520 overlaid on the application content 500 may correspond to the moving vehicle 222 of FIG. 2.

Referring again to FIG. 2, the controller 130 may analyze the change in the light to minimize a portion in which the change in the light is represented to be overlaid on the image content. For example, the detector 120 may detect all the light reflected from the moving person 221 and incident to the detector 120. In this exemplary embodiment, the controller 130 may detect pixels corresponding to the change in the light detected by the detector 120. The controller 130 may extract a minimum number of pixels capable of representing the change in the light from among the detected pixels. Specifically, the controller 130 may extract a minimum number of pixels corresponding to an outline from among the detected pixels. The controller 130 may control values of the extracted minimum number of pixels so that the change in the light may be represented to be overlaid on the image content.

The controller 130 may control values of the extracted minimum number of pixels using a variety of methods. For example, the controller 130 may set values of the extracted minimum number of pixels as predetermined values. The controller 130 may control a predetermined color, for example, black or white, to be displayed on the extracted minimum number of pixels. Alternatively, the controller 130 may adjust values of the extracted minimum number of pixels using a predetermined method. The controller 130 may adjust content values for the extracted minimum number of pixels. The controller 130 may increase or decrease brightness of content values for the extracted minimum number of pixels.

Although exemplary embodiments of detecting the change in the light occurring due to the moving object 220 are described, the exemplary embodiments may be applicable to exemplary embodiments of detecting the change in the light occurring due to a movement of the user 200.

For example, when it is assumed that the user 200 is walking on the street with holding the user interface apparatus 100, the light may vary due to the stationary object 210 as well as the moving object 220. In this exemplary embodiment, the detector 120 may detect the change in the light by the stationary object 210 as well as the change in the light by the moving object 220.

The controller 130 may control the display 110 to represent the detected change in the light to be overlaid on the image content. The user interface apparatus 100 may provide change information of the surrounding environment to the user 200 by displaying objects corresponding to the change in the light. Here, the user interface apparatus 100 may represent change information of the surrounding environment to be overlaid on the image content so that the user 200 may be provided with change information of the surrounding environment with continuously using the image content.

The controller 130 may generate information associated with an object around the user 200 based on the change in the light. For example, the controller 130 may generate information associated with at least one of a type of an object, a velocity of the object, a distance between the user 200 and the object, and a location of the object based on the change in the light. The controller 130 may control the display 110 based on the generated information. For example, the controller 130 may control the display 110 to represent the generated information to be overlaid on the image content.

The controller 130 may determine whether the change in the light is caused by a hand of the user 200. When the change in the light is determined to be caused by the hand of the user 200, the controller 130 may process a user input based on the change in the light. For example, the controller 130 may recognize a hand motion of the user 200 based on the change in the light. The controller 130 may execute an instruction correspond to the recognized hand motion of the user 200.

The detector 120 may detect a change in a sound. The change in the sound may include a change in a magnitude of sound and a change in a frequency of sound. The detector 120 may detect whether an input sound increases or decreases, that is, becomes louder or becomes smaller, or whether a frequency of the input sound increases or decreases, that is, becomes higher or becomes lower.

The change in the sound may occur due to an object moving around the user 200. For example, when an object that generates a predetermined sound approaches the user 200, the detector 120 may detect the change in the sound based on Doppler effect. Alternatively, when the object that generates the predetermined sound goes away from the user, the detector 120 may detect the change in the sound based on Doppler effect. Based on the same principle as the change in the sound occurring due to the moving object, the change in the sound may occur due to a movement of the user 200.

Figure 6:
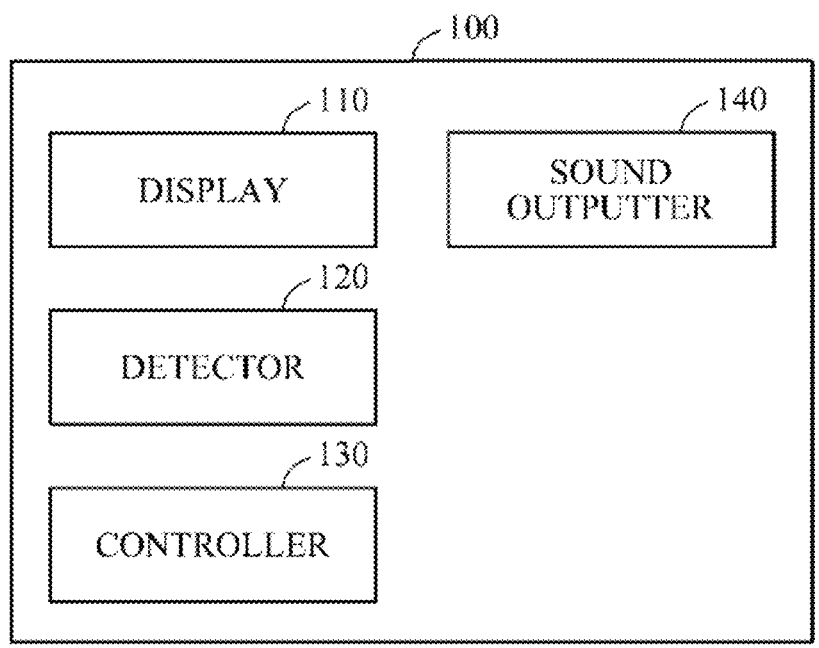

Referring to FIG. 6, the user interface apparatus 100 may further include a sound outputter 140. The sound outputter 140 may output sound content. The sound content may include music, radio broadcasting, language education, and a voice call.

The controller 130 may control the sound outputter 140 to output the change in the external sound detected by the detector 120. For example, in response to the change in the external sound detected by the detector 120, the controller 130 may control the sound outputter 140 to output the external sound instead of outputting the sound content. Alternatively, the controller 130 may output the sound outputter 140 to concurrently output the sound content and the external sound. In this exemplary embodiment, the controller 130 may decrease a volume of the sound content to effectively transfer the external sound to a user.

The controller 130 may analyze the change in the external sound to minimize a duration of time in which the change in the external sound is output. For example, the controller 130 may compare a level of the change in the external sound detected by the detector 120 to a predetermined threshold. The controller 130 may control the sound outputter 140 to output the change in the external sound only when the level of the change in the sound is greater than the predetermined threshold.

The controller 130 may generate information associated with a sound source around the user based on the change in the external sound. For example, the controller 130 may generate information associated with at least one of a type of the sound source and a location of the sound source based on the change in the external sound. The controller 130 may control at least one of the display 110 and the sound outputter 140 based on the generated information. For example, the controller 130 may control the display 110 to represent the generated information to be overlaid on the image content. Alternatively, the controller 130 may control the sound outputter 140 to output the generated information.

The detector 120 may detect a change in various surrounding environments. As an example, the detector 120 may detect a change in a temperature or humidity around the user. In an exemplary embodiment, the detector 120 may detect a change in concentration of a predetermined material such as fine dust and carbon oxide.

The controller 130 may generate information associated with the surrounding environment of the user, based on the detected change in the surrounding environment. For example, the controller 130 may generate information indicating the detected change in the surrounding environment. The controller 130 may control the display 110 to represent the generated information to be overlaid on the image content. Alternatively, the controller 130 may control the sound outputter 140 to output the generated information.

Figure 7:
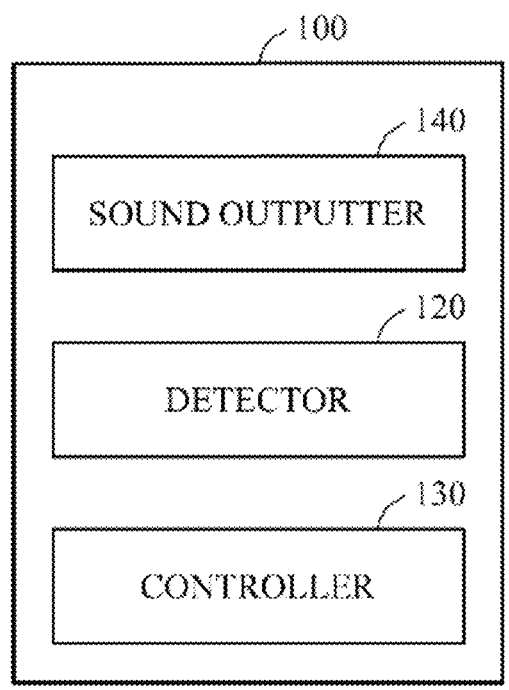

Referring to FIG. 7, the user interface apparatus 100 may include the sound outputter 140, the detector 120, and the controller 130. The sound outputter 140 may output sound content. The sound content may include music, radio broadcasting, a language education, and a voice call. The detector 120 may detect the change in an external sound. For example, the detector 120 may detect whether the input external sound increases or decreases (i.e., the sound becomes louder or becomes softer), or whether a frequency of the input sound increases or decreases (i.e., the frequency becomes higher or becomes lower).

The controller 130 may control the sound outputter 140 to output the change in the external sound detected by the detector 120. For example, in response to the change in the external sound detected by the detector 120, the controller 130 may control the sound outputter 140 to output the external sound instead of outputting the sound content. Alternatively, the controller 130 may control the sound outputter 140 to concurrently output the sound content and the external sound. In this exemplary embodiment, the controller 130 may decrease a volume of the sound content to effectively transfer the external sound to the user.

The controller 130 may analyze the change in the external sound to minimize a duration of time in which the change in the external sound is output. For example, the controller 130 may compare a level of the change in the external sound detected by the detector 120 to a predetermined threshold. The controller 130 may control the sound outputter 140 to output the change in the sound only when the level of the change in the external sound is greater than the predetermined threshold.

The controller 130 may generate information associated with a sound source around the user based on the change in the external sound. For example, the controller 130 may generate information associated with at least one of a type of the sound source and a location of the sound source based on the change in the sound. The controller 130 may control the sound outputter 140 based on the generated information. For example, the controller 130 may control the sound outputter 140 to output the generated information.

Figure 8:
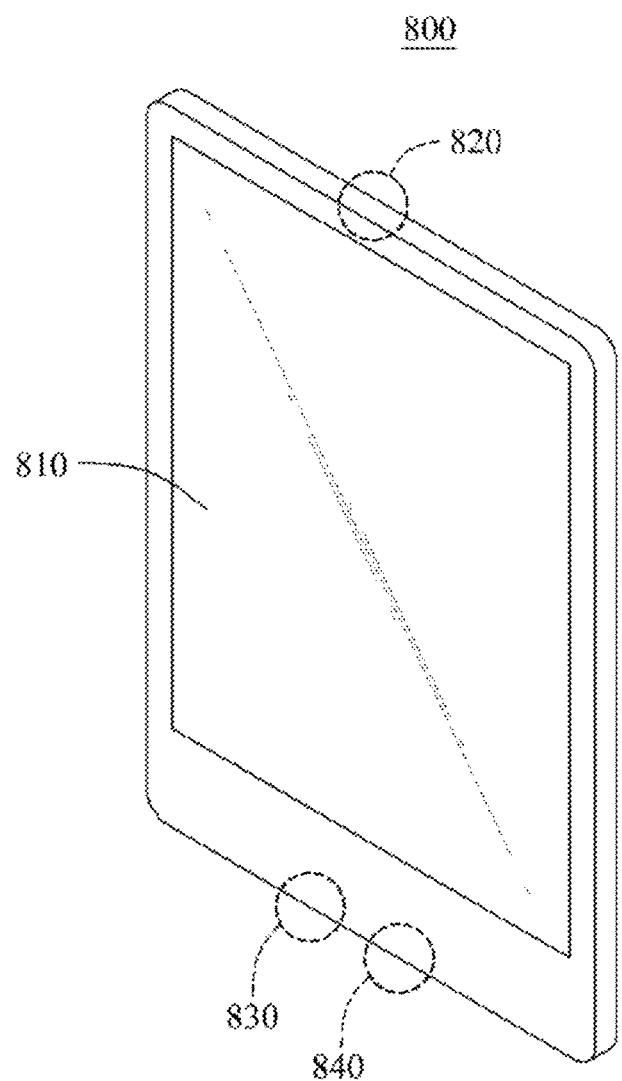
FIG. 8 illustrates a mobile device including a user interface apparatus according to an exemplary embodiment.

FIG. 8 illustrates a mobile device 800 including a user interface apparatus according to an exemplary embodiment. Referring to FIG. 8, the user interface apparatus may be configured as the mobile device 800. The mobile device 800 may be configured as a mobile phone, a smartphone, a personal digital assistant (PDA), and a tablet computer. The mobile device 800 may include a display 810, a first detector 820, a second detector 830, and a sound outputter 840.

The display 810 may display image content and the sound outputter 840 may output sound content. The sound outputter 840 may be configured as a speaker or an earphone port. The first detector 820 may detect a change in an incident light and the second detector 830 may detect a change in an input sound. A controller of the mobile device 800 may control the display 810 to represent the change in the light to be overlaid on the image content. The controller may control the sound outputter 840 to output the change in the external sound.

The description made above with reference to FIGS. 1 through 5 may be applicable to modules of FIG. 8 and thus, a further description related thereto will be omitted.

Figure 9:
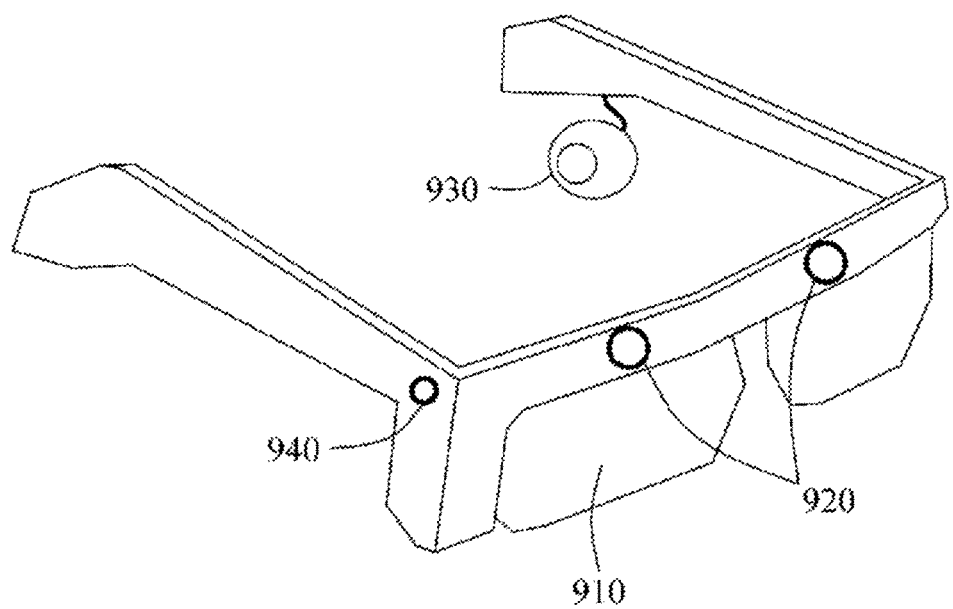
FIG. 9 illustrates a wearable device including a user interface apparatus according to an exemplary embodiment.

FIG. 9 illustrates a wearable device 900 including a user interface apparatus according to an exemplary embodiment. Referring to FIG. 9, the user interface apparatus may be configured as the wearable device 900. The wearable device 900 may be provided as an HMD in a shape of glasses, a hair band, or a cap. The wearable device 900 may include a display 910, a first detector 920, a second detector 940, and a sound outputter 930.

The display 910 may display image content and the sound outputter 930 may output sound content. The first detector 920 may detect a change in an incident light and the second detector 940 may detect a change in an input external sound. A controller of the wearable device 900 may control the display 910 to represent the change in the light to be overlaid on the image content. The controller may control the sound outputter 930 to output the change in the sound.

The description made above with reference to FIGS. 1 through 5 may be applicable to modules of FIG. 9 and thus, a further description related thereto will be omitted.

Figure 10:
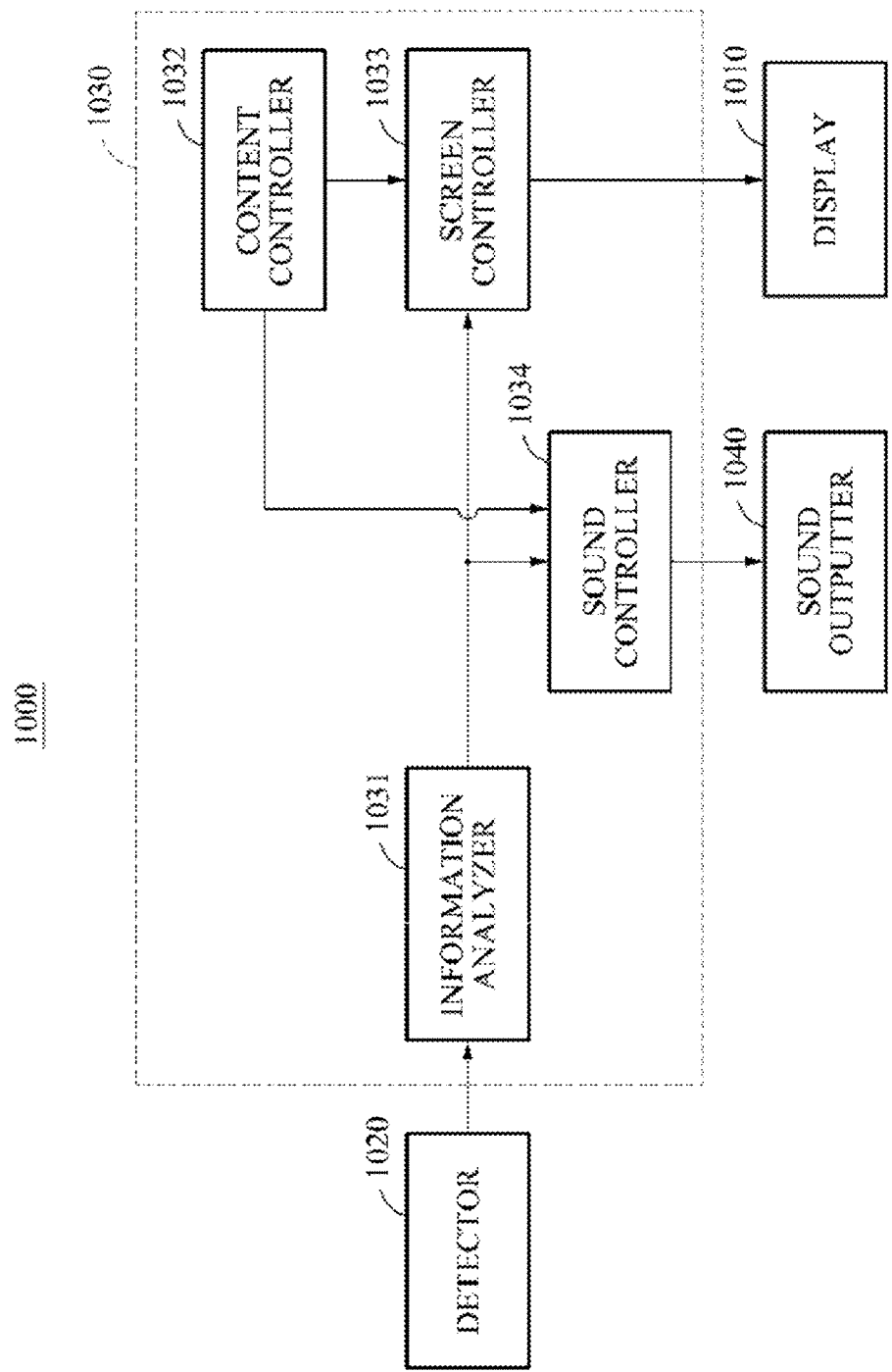
FIG. 10 illustrates a controller according to an exemplary embodiment.

FIG. 10 illustrates a controller 1030 according to an exemplary embodiment. Referring to FIG. 10, a user interface apparatus 1000 may include a display 1010, a detector 1020, the controller 1030, and a sound outputter 1040.

The display 1010 may display image content and the sound outputter 1040 may output sound content. The detector 1020 may detect a change in an incident light and may also detect a change in an input sound. The 1030 may control the display 1010 to represent the change in the light to be overlaid on the image content. The controller 1030 may control the sound outputter 1040 to output the change in the input sound.

The controller 1030 may include an information analyzer 1031, a content controller 1032, a screen controller 1033, and a sound controller 1034. The information analyzer 1031 may generate information to be provided to a user by analyzing the change in the light or the change in the sound detected by the detector 1020. Information to be provided to the user may include at least one of pixels for representing the detected change in the light, information associated with an object corresponding to the detected change in the light, an external sound corresponding to the detected change in the sound, and information associated with a sound source corresponding to the detected change in the sound.

The content controller 1032 may provide the image content to be displayed on the display 1010, or may provide the sound content to be output to the sound outputter 1040. The screen controller 1033 may control the display 1010 based on the image content provided from the image controller 1032 and information generated by the information analyzer 1031. For example, the screen controller 1033 may separately control the pixels for representing the detected change in the light while displaying the image content on the display 1010.

The sound controller 1034 may control the sound outputter 1040 based on the sound content provided from the content controller 1032 and information generated by the information analyzer 1031. For example, the sound controller 1034 may control the sound outputter 1040 to output the sound content and the external sound corresponding to the detected change in the sound.

Figure 11:
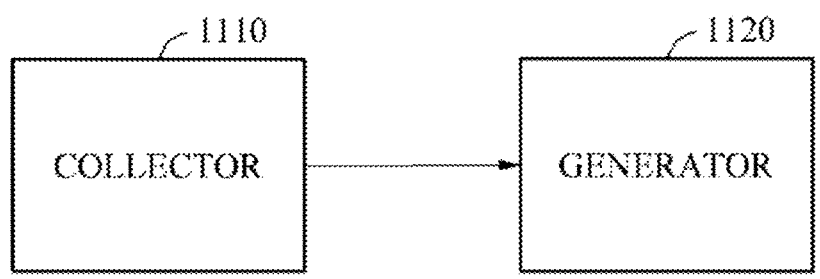
FIGS. 11 through FIG. 14 illustrate detectors according to exemplary embodiments.

FIGS. 11 through FIG. 14 illustrate various detectors according to exemplary embodiments. Referring to FIG. 11, the detector may include a collector 1110 and a generator 1120. The collector 1110 may collect an incident light. The generator 1120 may generate a signal indicating a change in the light by analyzing the collected light. For example, the collector 1110 may include a frame-based vision sensor. The collector 1110 may detect a change in an input image between neighboring frames. The generator 1120 may generate a signal indicating the change in the input image. The generator 1120 may generate a signal indicating pixels corresponding to the changed input image.

Figure 12:
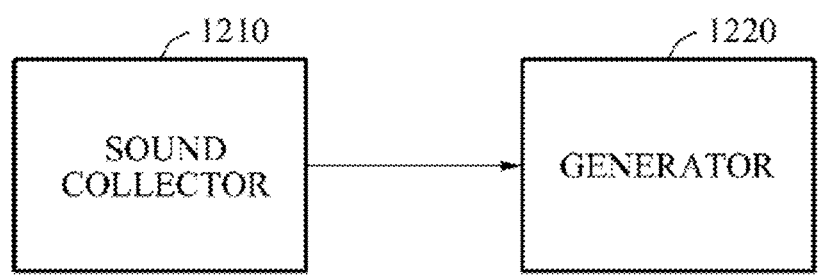

Referring to FIG. 12, the detector may include a sound collector 1210 and a generator 1220. The sound collector 1210 may collect an input sound. The generator 1220 may generate a signal indicating a change in the sound by analyzing the collected sound. For example, the sound collector 1210 may acquire the input sound per time interval. The generator 1220 may detect a change in the input sound between neighboring time intervals. The generator 1220 may generate a signal indicating the change in the input sound. The generator 1120 may generate a signal notifying that the change in the input sound is detected.

Figure 13:
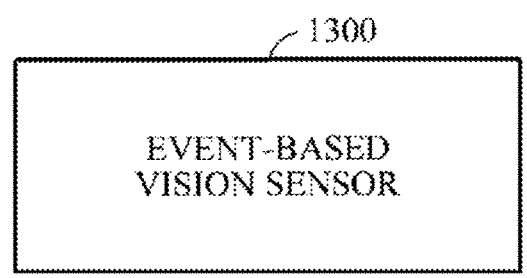

Referring to FIG. 13, the detector may include an event-based vision sensor 1300. The event-based vision sensor 1300 may time-asynchronously output an event signal in response to detecting a light change event. The event signal may be a signal indicating a change in a light. A frame-based vision sensor scans an output of a photo diode of each pixel based on a frame unit, whereas the event-based vision sensor 1300 may output only an event signal of a pixel in which the change in the light occurs. The event-based vision sensor 1300 has a relatively short latency compared to the frame event-based sensor. Accordingly, it is possible to achieve a real-time feedback in which a substantial delay is absent through the event-based vision sensor 1300.

The event-based vision sensor 1300 may detect a predetermined event. For example, the event-based vision sensor 1300 may detect an event where brightness of light increases (i.e., the light becomes brighter). Alternatively, the event-based vision sensor 1300 may detect an event where the brightness of light decreases(i.e., the light becomes darker). Alternatively, the event-based vision sensor 1300 may detect an event where a wavelength of light decreases (i.e., the wavelength of light becomes shorter) or may detect an event where the wavelength of light increases (i.e., the wavelength of light becomes longer).

The event-based vision sensor 1300 may include a plurality of pixels for detecting the change in the light. As an example, the event-based vision sensor 1300 may include first pixels for detecting an event where the light becomes brighter compared to a predetermined reference value. When the event is detected from among at least a portion of the first pixels, the event-based vision sensor 1300 may output a first event signal corresponding to the detected pixels.

In another exemplary embodiment, the event-based vision sensor 1300 may include second pixels for detecting an event where the light becomes darker compared to a predetermined reference value. When the event is detected from among at least a portion of the second pixels, the event-based vision sensor 1300 may output a second event signal corresponding to the detected pixels.

In yet another exemplary embodiment, the event-based vision sensor 1300 may include a combination of the first pixels for detecting the event where the light becomes brighter compared to the predetermined reference value and the second pixels for detecting the event where the light becomes darker compared to the predetermined reference value. When the event where the light becomes brighter compared to the predetermined reference value is detected from among at least a portion of the first pixels, the event-based vision sensor 1300 may output a first event signal corresponding to the detected pixels. When the event where the light becomes darker compared to the predetermined reference value is detected from among at least a portion of the second pixels, the event-based vision sensor 1300 may output a second event signal corresponding to the detected pixels.

In yet another exemplary embodiment, the event-based vision sensor 1300 may include third pixels for detecting an event where light becomes brighter or darker compared to a predetermined reference value. When the event where the light becomes brighter compared to the predetermined reference value is detected from among at least a portion of the third pixels, the event-based vision sensor 1300 may output a first event signal corresponding to the detected pixels. Also, when the event where the light becomes darker compared to the predetermined reference value is detected from at least a portion of the third pixels, the event-based vision sensor 1300 may output a second event signal corresponding to the detected pixels.

Figure 14:
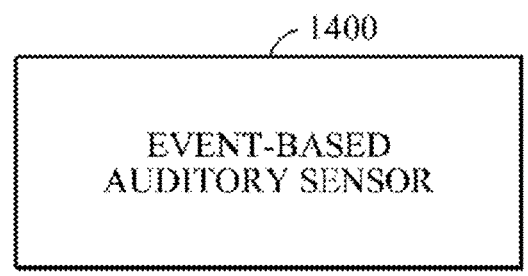

Referring to FIG. 14, the detector may include an event-based auditory sensor 1400. In response to detecting a sound change event, the event-based auditory sensor 1400 may asynchronously output an event signal. The event signal may be a signal indicating a change in a sound. A general auditory sensor, for example, a microphone may convert the input sound to an analog signal or a digital signal, whereas the event-based auditory sensor 1400 may output only the event signal in reaction to the change in the sound.

The event-based auditory sensor 1400 has a relatively short latency compared to the general auditory sensor. Accordingly, it is possible to achieve a real-time feedback in which a substantial delay is absent through the event-based auditory sensor 1400.

The event-based auditory sensor 1400 may detect a predetermined event. For example, the event-based auditory sensor 1400 may detect an event where a magnitude of a sound increases(i.e., the sound becomes louder). Alternatively, the event-based auditory sensor 1400 may detect an event where the magnitude of the sound decreases(i.e., the sound becomes softer). Alternatively, the event-based auditory sensor 1400 may detect an event where a frequency of the sound increases. Alternatively, the event-based auditory sensor 1400 may detect an event where the frequency of the sound decreases.

The event-based auditory sensor 1400 may include a plurality of elements for detecting the change in the sound. In an exemplary embodiment, the event-based auditory sensor 1400 may include first elements for detecting an event where a magnitude of sound increases compared to a predetermined reference value. When the event is detected from among at least a portion of the first elements, the event-based auditory sensor 1400 may output a third event signal corresponding to the detected elements.

In another exemplary embodiment, the event-based auditory sensor 1400 may include second elements for detecting an event where the magnitude of the sound decreases compared to the predetermined reference value. When the event is detected from among at least a portion of the second elements, the event-based auditory sensor 1400 may output a fourth event signal corresponding to the detected elements.

In another exemplary embodiment, the event-based auditory sensor 1400 may include a combination of the first elements for detecting the event where the magnitude of the sound increases compared to the predetermined reference value and the second elements for detecting the event where the magnitude of the sound decreases compared to the predetermined reference value. When the event where the magnitude of the sound increases compared to the predetermined reference value is detected through the first elements, the event-based auditory sensor 1400 may output a third event signal corresponding to the detected elements. When the event where the magnitude of the sound decreases compared to the predetermined reference value is detected through the second elements, the event-based auditory sensor 1400 may output a fourth event signal corresponding to the detected elements.

In another exemplary embodiment, the event-based auditory sensor 1400 may include third elements for detecting an event where the magnitude of the sound increases or decreases compared to the predetermined reference value. When the event where the magnitude of the sound increases compared to the predetermined reference value is detected from among at least a portion of the third elements, the event-based auditory sensor 1400 may output a third event signal corresponding to the detected elements. When the event where the magnitude of the sound decreases compared to the predetermined reference value is detected from among at least a portion of the third pixels, the event-based auditory sensor 1400 may output a fourth event signal corresponding to the detected third elements.

Figure 15:
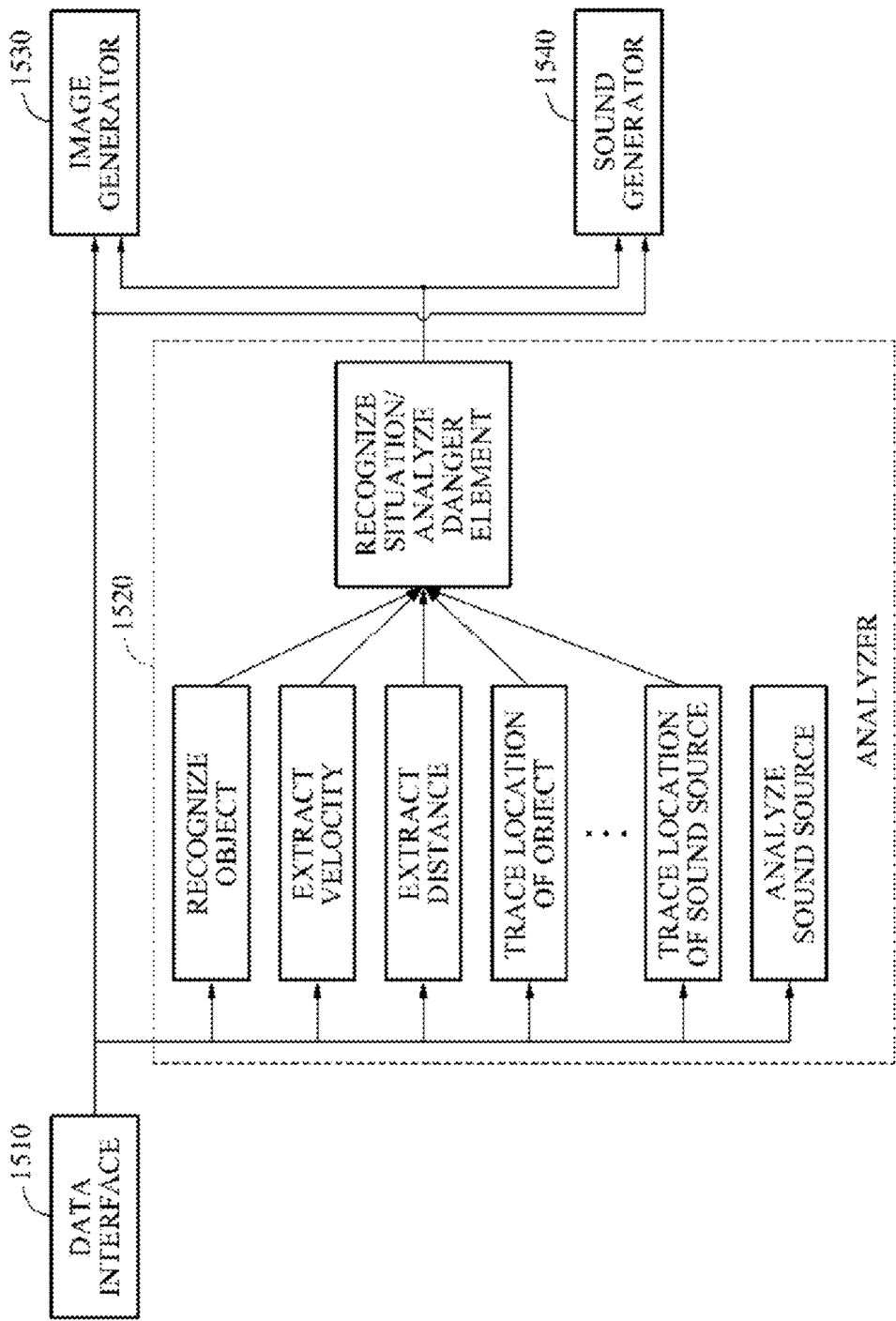
FIG. 15 illustrates an information analyzer according to an exemplary embodiment.

FIG. 15 illustrates an information analyzer according to an exemplary embodiment. Referring to FIG. 15, the information analyzer includes a data interface 1510, an analyzer 1520, an image generator 1530, and a sound generator 1540. The data interface 1510 may receive information detected by a detector. The detected information may include a change in a light or a change in a sound.

The analyzer 1520 may analyze the detected information. For example, the analyzer 1520 may recognize an object based on the detected information, and may extract a velocity of the object or a distance from the object based on the detected information. The analyzer 1520 may trace a location of the object based on the detected information. The analyzer 1520 may trace a location of a sound source based on the detected information. The analyzer 1520 may analyze the sound source based on the detected information. The analyzer 1520 may recognize a situation around a user by analyzing the detected information. The analyzer 1520 may analyze a danger element around the user.

The image generator 1530 may generate image information to be provided to the user based on information received through the data interface 1510 and information analyzed by the analyzer 1520. The sound generator 1540 may generate sound information based on information received through the data interface 1510 and information analyzed by the analyzer 1520.

Figure 16:
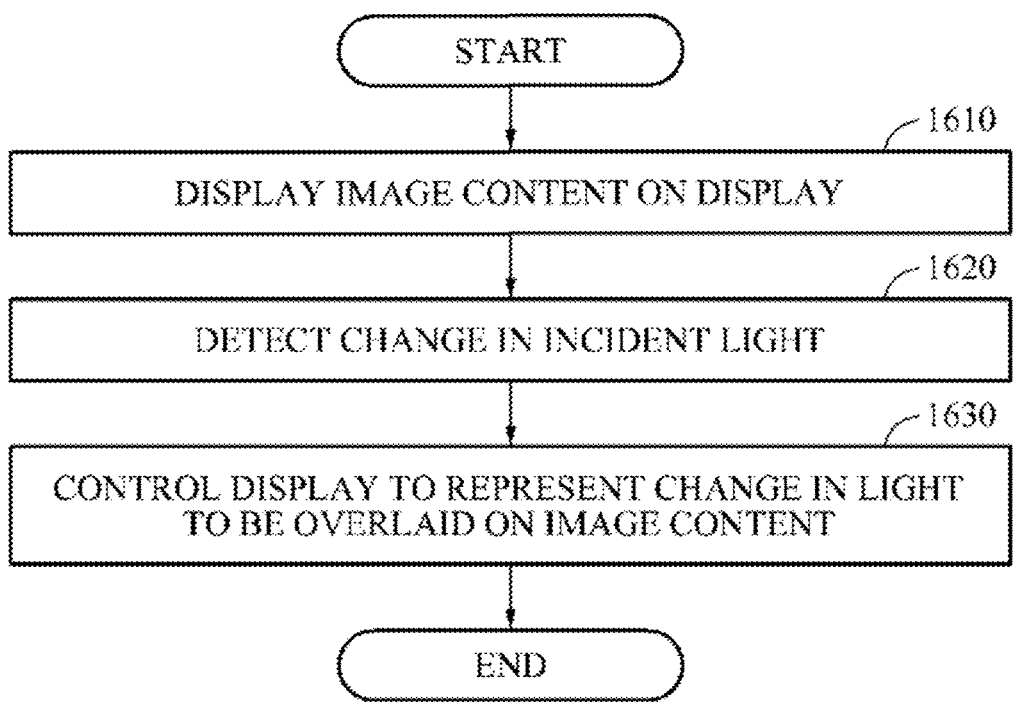
FIGS. 16 and 17 illustrate methods of improving user interface according to exemplary embodiments.
Figure 17:
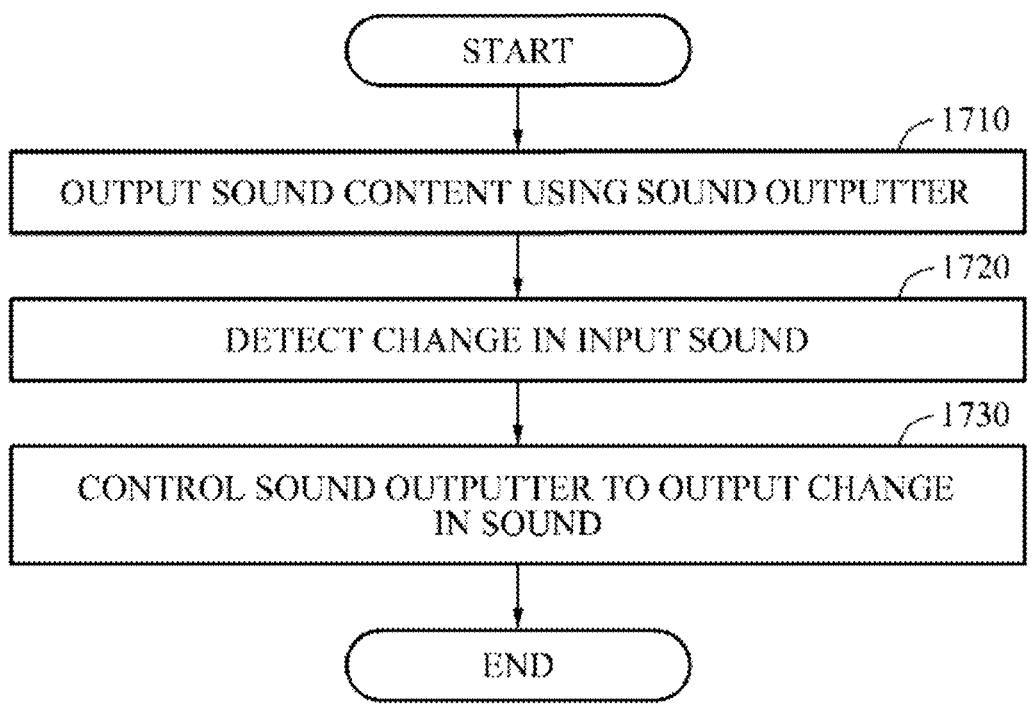

FIGS. 16 and 17 illustrate methods of improving user interface according to exemplary embodiments. Referring to FIG. 16, the user interface method may include operation 1610 of displaying image content on a display, operation 1620 of detecting a change in an incident light, and operation 1630 of controlling the display to represent the change in the light to be overlaid on the image content.

Referring to FIG. 17, the method of improving user interface may include operation 1710 of outputting sound content using a sound outputter, operation 1720 of detecting a change in an input sound, and operation 1730 of controlling the sound outputter to output the change in the sound. The description made above with reference to FIGS. 1 through 15 may be applicable to operations of FIGS. 16 and 17 and thus, a further detailed description related thereto will be omitted.

A wearable device in a type of an HMD may block the visual field of a user. A wearable device or a mobile device in a type of glasses may not directly block the visual field of the user. However, the user concentrates on content and thus, may not easily recognize a change in an environment occurring ahead of the user. Accordingly, a negligent accident may occur.

Exemplary embodiments may provide technology that enables a user to secure a minimum visual field for the safety of the user during a use of a wearable device or a mobile device. Exemplary embodiments may also provide technology for additionally displaying information associated with a change in a surrounding environment of the user on a display when the user using a wearable device or a mobile device concentrates on a screen. Exemplary embodiments enable a user to secure a visual field of the user with a wearable device on or during a use of content and may notify the user about the change in the surrounding environment. Accordingly, it is possible to prevent the occurrence of a negligent accident.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more non-transitory computer readable recording mediums.

The method according to the exemplary embodiments described herein may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes embodied herein, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described exemplary embodiments, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A user interface apparatus comprising:
   a display configured to display image content, the image content being unrelated to a surrounding environment of the user interface apparatus;
   a detector implemented by at least one sensor and configured to detect an object of the surrounding environment of the user interface apparatus moving with respect to the user interface apparatus; and
   a controller implemented by at least one hardware processor, configured to generate an object image representing the detected object, and configured to control the display to overlay the object image on the image content while continuously displaying the image content.

2. The user interface apparatus of claim 1, wherein the detector comprises an event-based vision sensor configured to detect an event where an incident light varies and configured to time-asynchronously generate a signal indicating a change in the incident light.

3. The user interface apparatus of claim 1, wherein the detector comprises:
   a collector configured to collect an incident light; and
   a generator configured to analyze the collected light and configured to generate a signal indicating a change in the incident light.

4. The user interface apparatus of claim 1, wherein the controller is configured to detect pixels corresponding to a change in a light from among a plurality of pixels of the display and is configured to control values of the detected pixels so that an overlaid change of the light is represented on the image content.

5. The user interface apparatus of claim 1, wherein the controller is configured to analyze a change in a light to minimize a portion in which the change in the light is represented to be overlaid on the image content.

6. The user interface apparatus of claim 1, wherein the controller is configured to generate information associated with an object present around a user based on a change in a light, and configured to control the display based on the generated information.

7. The user interface apparatus of claim 6, wherein the information associated with the object comprises at least one of a type of the object, a velocity of the object, a distance between the user and the object, and a location of the object.

8. The user interface apparatus of claim 1, wherein the controller is configured to determine whether a change in a light is caused by a hand of a user, and configured to process a user input based on the change in the light in response to the change in the light being determined to be caused by the hand of the user.

9. The user interface apparatus of claim 1, wherein an incident light comprises an incident light from a surrounding environment of the user interface apparatus.

10. A mobile device comprising the user interface apparatus of claim 1.

11. A wearable device comprising the user interface apparatus of claim 1.

12. The user interface apparatus of claim 1, wherein the object image comprises an outline of the detected object.

13. A user interface method comprising:
 displaying image content on a display, the image content being unrelated to a surrounding environment of a user interface apparatus;
 detecting, by a detector implemented by at least one sensor, an object of the surrounding environment of the user interface apparatus moving with respect to the user interface apparatus;
 generating, by a controller implemented by at least one hardware processor, an object image representing the detected object; and
 controlling, by the controller, the display to overlay the object image on the image content while continuously displaying the image content on the display.

14. The user interface method of claim 13, wherein the object image comprises an outline of the detected object.

15. A user interface apparatus comprising:
 a display configured to display image content, the image content being unrelated to a surrounding environment of the user interface apparatus;
 a detector implemented by at least one sensor and configured to detect a moving object in the surrounding environment of the user interface apparatus while the user interface apparatus is being held by a user; and
 a controller implemented by at least one hardware processor and configured to control the display to overlay the detected moving object on the image content and display the image content and the detected object simultaneously.

16. The user interface apparatus of claim 15, wherein the detector is configured to detect the object by detecting a change of amount of light by the detector.

* * * * *